United States Patent
Zhao et al.

(10) Patent No.: US 12,046,765 B2
(45) Date of Patent: Jul. 23, 2024

(54) ELECTROMAGNETIC SHIELDED BATTERY TRAY WITH METAL COATED FIBER STITCHED WALLS AND CORRESPONDING MANUFACTURING PROCESSES

(71) Applicant: GM GLOBAL TECHNOLOGY OPERATIONS LLC, Detroit, MI (US)

(72) Inventors: Selina Xinyue Zhao, Rochester Hills, MI (US); Venkateshwar R. Aitharaju, Troy, MI (US); Bhavesh Shah, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 185 days.

(21) Appl. No.: 17/495,731

(22) Filed: Oct. 6, 2021

(65) Prior Publication Data
US 2023/0103585 A1 Apr. 6, 2023

(51) Int. Cl.
*H01M 10/00* (2006.01)
*B29C 70/22* (2006.01)
*H01M 50/229* (2021.01)
*H01M 50/231* (2021.01)
*H01M 50/24* (2021.01)
(Continued)

(52) U.S. Cl.
CPC ............ *H01M 50/24* (2021.01); *B29C 70/226* (2013.01); *H01M 50/229* (2021.01); *H01M 50/231* (2021.01); *B29C 43/203* (2013.01); *B29C 70/48* (2013.01); *B29K 2105/089* (2013.01); *B29L 2031/3468* (2013.01)

(58) Field of Classification Search
CPC .. H01M 50/24; H01M 50/229; H01M 50/231; B29C 70/226; B29C 43/203; B29C 70/48; B29C 2793/0027; B29C 2793/0081; B29C 70/545; B29C 70/504; B29K 2105/089; B29L 2031/3468; B29L 2031/7146; Y02E 60/10

See application file for complete search history.

(56) References Cited

U.S. PATENT DOCUMENTS 7,819,462 B1   10/2010 Owens
8,033,592 B2   10/2011 Hsu et al.
(Continued)

FOREIGN PATENT DOCUMENTS

CN   110299476 A  * 10/2019  ................ C08J 5/06

OTHER PUBLICATIONS

Machine translation of CN-110299476-A, obtained Aug. 2023 (Year: 2019).*
(Continued)

*Primary Examiner* — Nicholas P D'Aniello (57) ABSTRACT

A battery tray is provided and includes a first component and a second component. The first component includes a first set of walls, where the first set of walls includes a first stitched fabric, and where the first stitched fabric includes first metal coated fibers. The second component includes a second set of walls, where: the second set of walls includes a second stitched fabric; the second stitched fabric includes second metal coated fibers; and the second component is attached to the first component to form the battery tray, which is configured to hold a battery pack of a vehicle. The first metal coated fibers and the second metal coated fibers provide an electromagnetic shield surrounding the battery pack.

20 Claims, 9 Drawing Sheets

(51) Int. Cl.
*B29C 43/20* (2006.01)
*B29C 70/48* (2006.01)
*B29K 105/08* (2006.01)
*B29L 31/34* (2006.01)

(56) References Cited

U.S. PATENT DOCUMENTS

| | | |
|---|---|---|
| 2006/0106147 A1 | 5/2006 | Fasulo et al. |
| 2006/0199890 A1 | 9/2006 | Fasulo et al. |
| 2007/0299185 A1 | 12/2007 | Ottaviani et al. |
| 2010/0098925 A1 | 4/2010 | Fasulo et al. |
| 2011/0121225 A1 | 5/2011 | Posudievsky et al. |
| 2016/0194792 A1* | 7/2016 | Satharasinghe ........ D04B 1/102 428/102 |
| 2021/0229327 A1 | 7/2021 | Aitharaju et al. |

OTHER PUBLICATIONS

Chen et al. "Comparison of electromagnetic shielding effectiveness properties of diverse conductive textiles via various measurement techniques" Journal of Materials Processing Technology 192-193 (2007) pp. 549-554 (Year: 2007).*

* cited by examiner

ELECTROMAGNETIC SHIELDED BATTERY TRAY WITH METAL COATED FIBER STITCHED WALLS AND CORRESPONDING MANUFACTURING PROCESSES

GOVERNMENT CLAUSE

This invention was made with government support under Grant No. DEEE0009204 awarded by the U.S. Department of Energy. The Government has certain rights in this invention.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery tray assemblies for battery packs of electric vehicles.

An electric vehicle includes a battery tray in which a battery pack is disposed. The battery pack provides power to various vehicle systems including propulsion systems, lighting systems, infotainment systems, air-conditioning systems, braking systems, steering systems, autonomous control systems, navigation systems, etc. The propulsion system may include one or more motors for driving wheels of the vehicle.

A battery tray is typically implemented as a housing having metal walls. A high-voltage power circuit that includes the battery pack is disposed in the housing and supplies power to the vehicle systems. A low-voltage control circuit may be disposed on or external to the housing and monitor states of the battery pack and control supply of power to the vehicle systems.

SUMMARY

A battery tray is provided and includes a first component and a second component. The first component includes a first set of walls, where the first set of walls includes a first stitched fabric, and where the first stitched fabric includes first metal coated fibers. The second component includes a second set of walls, where: the second set of walls includes a second stitched fabric; the second stitched fabric includes second metal coated fibers; and the second component is attached to the first component to form the battery tray, which is configured to hold a battery pack of a vehicle. The first metal coated fibers and the second metal coated fibers provide an electromagnetic shield surrounding the battery pack.

In other features, the first stitched fabric includes first stitched fabric layers.

The second stitched fabric includes second stitched fabric layers.

In other features, each of the first stitched fabric layers includes some of the first metal coated fibers. Each of the second stitched fabric layers includes some of the second metal coated fibers.

In other features, the first stitched fabric is implemented as a first preform. The second stitched fabric is implemented as a second preform.

In other features, the first stitched fabric includes first apertures with some of the first metal coated fibers extending through the first apertures. The second stitched fabric includes second apertures with some of the second metal coated fibers extending through the second apertures.

In other features, each of the first apertures and the second apertures has a cross-sectional dimension greater than $\lambda/50$ and less than $\lambda/20$. The cross-sectional dimensions are measured perpendicular to at least one of (i) respective longitudinal lengths of the first apertures and the second apertures, or (ii) respective paths of the first apertures and the second apertures.

In other features, each of the first metal coated fibers and the second metal coated fibers includes an inner non-metallic fibrous core and a metallic coating disposed over the inner non-metallic fibrous core.

In other features, the first metal coated fibers and the second metal coated fibers are connected to a reference ground.

In other features, the first stitched fabric and the second stitched fabric collectively include: 25%-59% reinforcement fibers by volume; 40%-70% polymeric resin matrix by volume; and 1-5% metal coated fibers by volume including the first metal coated fibers and the second metal coated fibers.

In other features, reinforcement fibers of the first stitched fabric and the second stitched fabric include at least one of glass fibers, carbon fibers, polyester fibers, or natural fibers.

In other features, the first metal coated fibers form at least one of an array of grids or an array of apertures and/or the second metal coated fibers form at least one of an array of grids or an array of apertures.

In other features, metallic coatings of the first metal coated fibers and the second metal coated fibers includes at least one of nickel or copper.

In other features, an areal density of the first metal coated fibers varies across the first stitched fabric and/or an areal density of the second metal coated fibers varies across the second stitched fabric.

In other features, a power system is provided and includes the battery tray, the battery pack contained within the battery tray, and a control circuit. The control circuit is connected to at least one of the battery tray or the battery pack and monitoring and controlling states of the battery pack.

In other features, a pressured resin transfer molding method of forming a battery tray of a vehicle is provided. The method includes: forming a stitched fabric including metal coated fibers and a binder; cutting the stitched fabric to provide sheets; stacking the sheets; draping the sheets over a portion of a first mold; heating and pressing the stacked sheets to form a preform; applying resin to the preform and curing the resin; and demolding the preform to provide a portion of the battery tray.

In other features, at least one of the metal coated fibers are stitched using a tailored fiber placement process.

In other features, the forming of the stitched fabric includes stitching at least some of the metal coated fibers through apertures in the stitched fabric, where the apertures extend through the stitched fabric.

In other features, the applying of the resin includes: disposing the preform in a second mold; positioning portions of the second mold in a partially open state; infusing the resin into the second mold and the preform; and pressing the resin infused preform.

In other features, a compression molding method of forming a battery tray of a vehicle is provided. The method includes: forming a prepreg material including metal coated fibers; preheating the prepreg material; pressing the heated prepreg material; cutting and stacking the pressed and heated prepreg material to form stacked plies of material; disposing the stacked plies of material in a heated press; and pressing the stacked plies of material to form a portion of the battery tray.

In other features, at least one of the metal coated fibers are stitched using a tailored fiber placement process. Forming of the prepreg material includes stitching at least some of the metal coated fibers through apertures in the prepreg material. The apertures extend through the prepreg material. The pressing of the heated prepreg material includes double belt pressing the heated prepreg material to consolidate fibers of the heated prepreg material.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A metal battery tray can operate as an electromagnetic shield and prevent electromagnetic interference between, for example, an electromagnetic field generated by a high-voltage circuit disposed within the battery tray and other electronic circuits disposed outside and/or in close vicinity of the battery tray. Electromagnetic interference (EMI) refers to electromagnetic emissions from a device and/or system that interferes with normal operation of another device and/or system. EMI can be broadly classified into radiated and conducted emissions. The metal battery tray provides electromagnetic compatibility between the battery tray and other electronic circuits external to the battery tray. Electromagnetic compatibility (EMC) refers to the ability of a system to function satisfactorily in an intended electromagnetic environment (EME) without introducing an intolerable electromagnetic disturbance to other electronic devices in that environment.

Although a metal battery tray can prevent EMI and can provide EMC for a high-voltage power circuit and other electronic components and systems, a metal battery tray can be heavy. In order to reduce weight of the metal battery tray, thickness of the walls of the battery tray can be reduced and/or lightweight metals may be used. However, it can be difficult to form highly-complex three-dimensional (3D) battery trays with thin walls that are durable and such battery trays can be expensive due to the materials involved and the costs of manufacturing.

Creating a safe and reliable battery pack requires a battery tray including a lower half (or bottom portion) and an upper half (or cover) to function satisfactorily in an electromagnetic environment. A battery tray may be formed of a polymer matrix including glass and/or carbon fibers. Although this type of battery tray can be lightweight, glass fibers and certain types of carbon fibers are EMI transparent. In order to make this type of battery tray such that it is not EMI transparent, the battery tray may be wrapped in a thin metallic foil (e.g., aluminum foil). Draping of a thin metallic foil and/or film layer (referred to as a veil) over a complicated 3D geometric body, such as a battery tray, can be challenging. A metallic foil wrapped battery tray can thus be expensive and the wrapping tends not to be durable.

As another example and in order to make a glass/carbon fiber style battery tray such that it is not EMI transparent, metallic fillers may be injected in resin used to fill spaces between glass and/or carbon fiber stitching. The metallic fillers improve conductivity and prevent EMI interference. However, to provide an adequate level of electrical conductivity and thus EMI interference prevention, a certain level of metallic fiber loading is needed. The loading of the metallic fillers can negate the lightweight benefit associated with the glass and/or carbon fibers alone. In addition, the infusion of the metallic fillers requires a secondary process to assure that the metallic fillers are homogenously dispersed into the resin, which is challenging.

Also, carbon fibers only filter out high-electromagnetic frequencies (e.g., in a gigahertz (GHz) range) but not on low electromagnetic frequencies (e.g. in a kilohertz (kHz) range). This depends on the continuity of the carbon fibers and how fiber tows have been weaved into a composite fabric material. Requirements of battery trays can require that the battery tray provide EMI shielding for frequencies greater than 1 kHz. As an example, a battery tray may be required to filter out electromagnetic frequencies greater than 200 mega-Hertz (MHz) and/or between 200 MHz and 10 GHz. When thin conductive layers (or veils) are designed to filter out high-frequency electromagnetic frequencies, composite part thickness affects electromagnetic shielding effectiveness (EMSE). This can affect (i.e. increase) the amount of space needed for the resulting battery tray in order to meet the performance requirements. High-frequency EMI noise can cause crosstalk between a high-voltage power circuit in a battery array (or battery pack) and a low-voltage control circuit in a battery management system.

Examples set forth herein include high-strength composite battery trays that provide EMI and EMC shielding performance. The disclosed battery trays have walls including fabric stitched with metal coated fibers. Continuous fiber preforms are formed using a tailored fiber placement method including stitching metal coated fibers to provide shields. The shields are able to reflect electromagnetic waves and prevent EMI between electronic components within the battery trays and other electronic components external to the battery trays. The battery trays are lightweight and provide enhanced EMI shielding performance as compared to other battery trays having walls formed with a stitched fabric made of polymeric materials.

Continuous metal coated fibers have high strength and high conductivity and are able to be weaved into fiber preforms to provide sufficient EMSE. The disclosed preforms include stitches made of metal and/or polymer materials and some of which have metallic coatings in various geometries, which form conductive paths. The preforms may include conductive fiber stitches in orthogonal grids and extending through apertures, which are sized to satisfy EMSE requirements.

Figure 1:
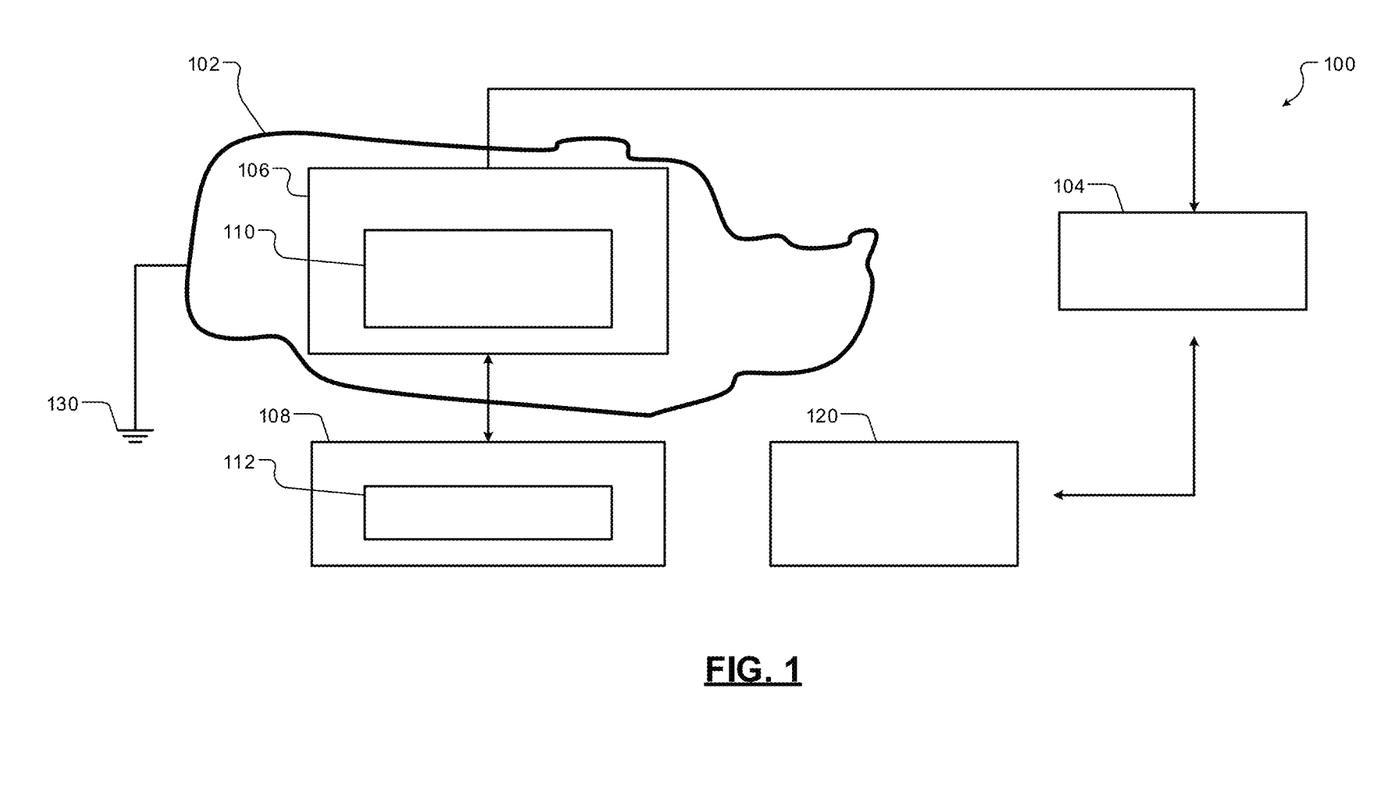
FIG. 1 is a functional block diagram of a vehicle power system including a battery tray in accordance with the present disclosure.
Figure 2:
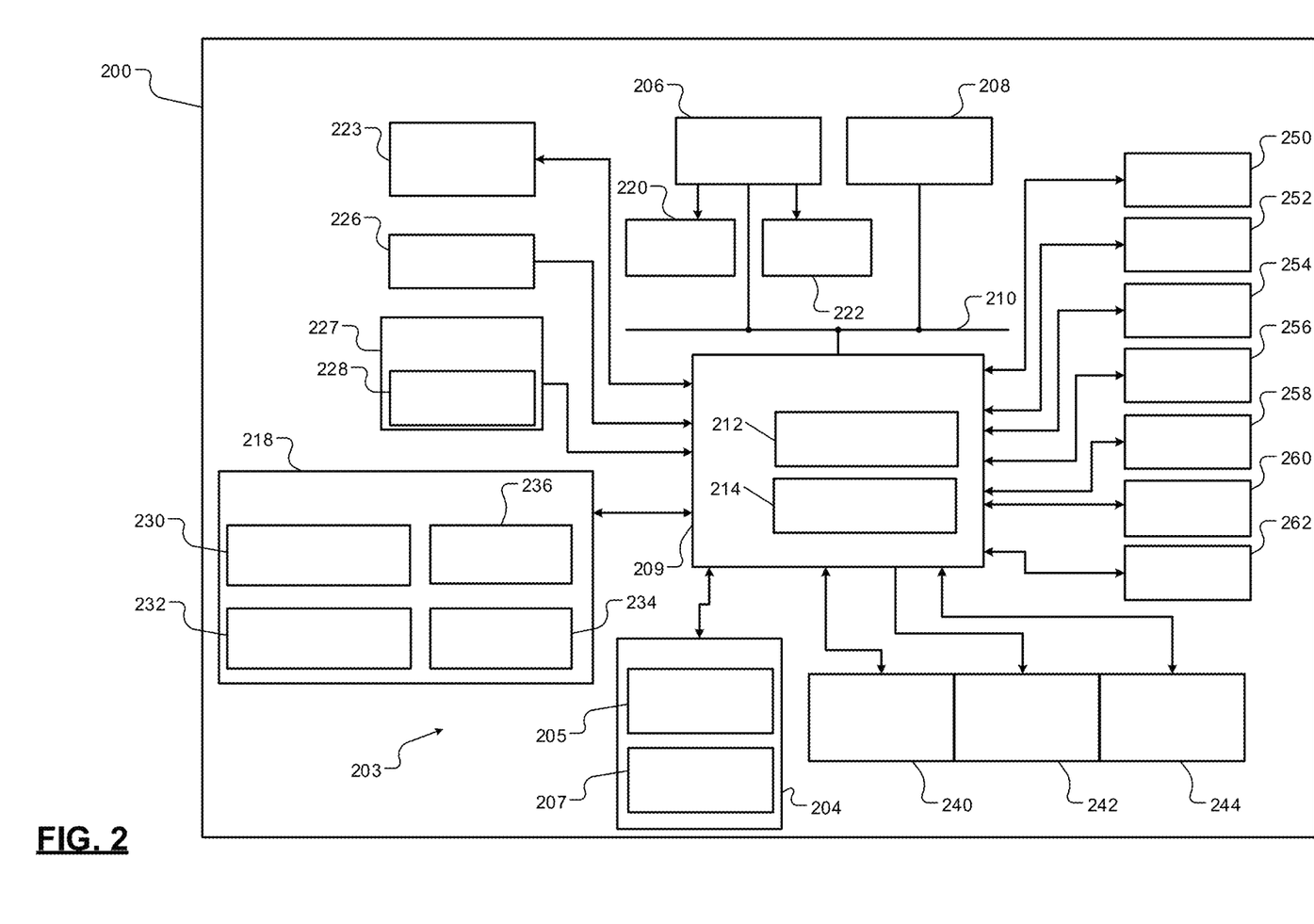
FIG. 2 is a functional block diagram of a vehicle including a power system including a power source with a battery tray in accordance with the present disclosure.

FIG. 1 shows a vehicle power system 100 including a battery tray 102 powering loads 104. The vehicle power system 100 may include a high-voltage power circuit 106 that monitored and controlled by a low-voltage control circuit 108. The high-voltage power circuit 106 is contained within the battery tray 102 and includes a battery pack 110. The low-voltage control circuit 108 includes a battery control module 112 that monitors operation and states of, for example, cells and/or groups of cells of the battery pack 110 and controls operation of the battery pack 110. The battery control module 112 may determine and control which cells of the battery pack 110 are supplying power to which ones of the loads 104. Examples of the loads 104 are shown in FIG. 2 and may include electronic components, devices, and systems including propulsion motors, actuator motors, lighting, navigation devices, infotainment devices, etc. The loads 104 may include high-voltage loads and low-voltage loads. A vehicle control module 120 may be in communication with the low-voltage control circuit 108 and control operation of the loads 104. The low-voltage control circuit 108 may be controlled by and/or be implemented as part of the vehicle control module 120.

Figure 3:
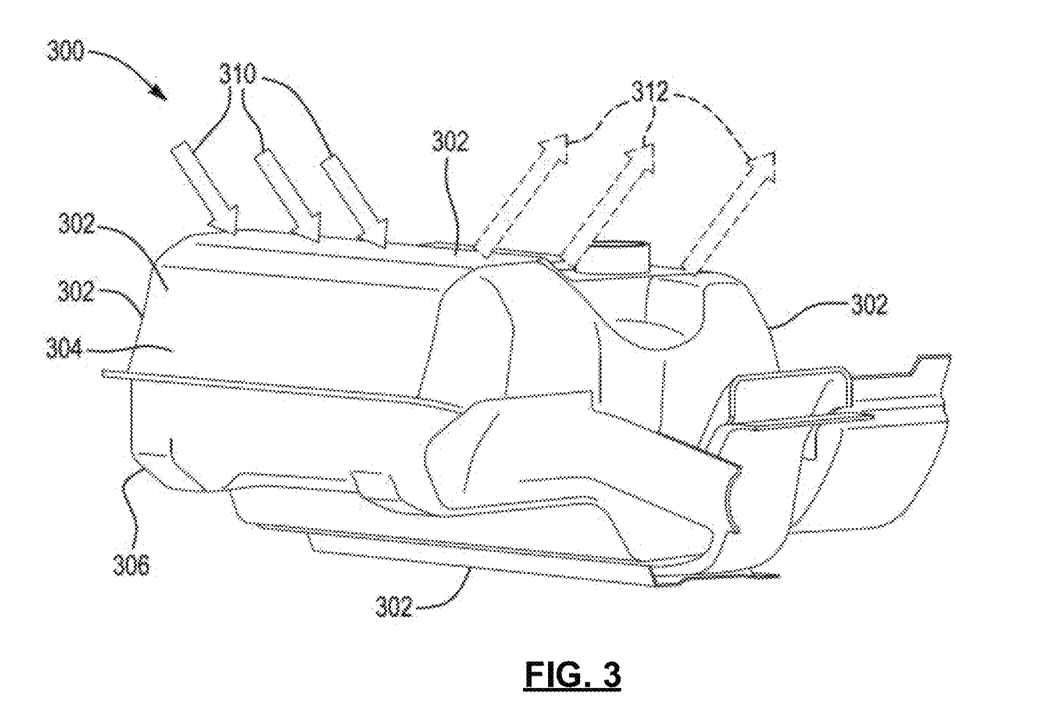
FIG. 3 is a perspective view of a battery tray including metal coated fibers in accordance with the present disclosure.

FIG. 2 shows a vehicle 200 including a power system 203 including a power source 204 including a battery tray (not shown in FIG. 2). Examples of the battery tray are shown in FIGS. 1 and 3. The power source 204 includes a battery pack 205 and a low-voltage control circuit 207 (e.g., the low-voltage control circuit 108 of FIG. 1). The battery tray provides an electromagnetic shield between the battery pack 205 and the other electronic devices, circuits and systems of the vehicle, some of which are shown in FIG. 2. This prevents electromagnetic waves generated within the battery tray from affecting devices outside of the battery tray and/or electromagnetic waves generated outside of the battery tray from affecting a high-voltage circuit within the battery tray. The low-voltage control circuit 207 may be located outside of the battery tray, such that the electromagnetic shielding provided by the battery tray does not affect wireless communication between the low-voltage control circuit 207 and other devices, such as a vehicle control module 209.

The vehicle 200 may also include the vehicle control module 209, an infotainment module 206 and other control modules 208. The vehicle control module 209 may replace the vehicle control module 120 of FIG. 1. The low-voltage control circuit 207 and the modules 209, 206, 208 may communicate with each other via one or more buses 210, such as a controller area network (CAN) bus and/or other suitable interfaces. The vehicle control module 209 may control operation of vehicle systems. The vehicle control module 209 may include a mode selection module 212, a parameter adjustment module 214, as well as other modules. The mode selection module 212 may select a vehicle operating mode. The parameter adjustment module 214 may be used to adjust parameters of the vehicle 200.

The vehicle 200 may further include: a memory 218; a display 220; an audio system 222; one or more transceivers 223 including sensors 226; and a navigation system 227 including a global positioning system (GPS) receiver 228. The sensors 226 may include sensors, cameras, objection detection sensors, temperature sensors, accelerometers, vehicle velocity sensor, and/or other sensors. The GPS receiver 228 may provide vehicle velocity and/or direction (or heading) of the vehicle and/or global clock timing information.

The memory 218 may store sensor data 230 and/or vehicle parameters 232, battery pack parameters 234, and applications 236. The applications 236 may include applications executed by the modules 209, 206, 208. Although the memory 218 and the vehicle control module 209 are shown as separate devices, the memory 218 and the vehicle control module 209 may be implemented as a single device.

The vehicle control module 209 may control operation of an engine 240, a converter/generator 242, a transmission 244, a window/door system 250, a lighting system 252, a seating system 254, a mirror system 256, a brake system 258, electric motors 260 and/or a steering system 262 according to parameters set by the modules 209, 206, 208. The vehicle control module 209 may set some of the parameters based on signals received from the sensors 226. The vehicle control module 209 may receive power from the power source 204, which may be provided to the engine 240, the converter/generator 242, the transmission 244, the window/door system 250, the lighting system 252, the seating system 254, the mirror system 256, the brake system 258, the electric motors 260 and/or the steering system 262, etc. Some of the vehicle control operations may include unlocking doors of the window/door system 250, enabling fuel and spark of the engine 240, starting the electric motors 260, powering any of the systems 250, 252, 254, 256, 258, 262, and/or performing other operations as are further described herein.

The engine 240, the converter/generator 242, the transmission 244, the window/door system 250, the lighting system 252, the seating system 254, the mirror system 256, the brake system 258, the electric motors 260 and/or the steering system 262 may include actuators controlled by the vehicle control module 209 to, for example, adjust fuel, spark, air flow, steering wheel angle, throttle position, pedal position, door locks, window position, seat angles, etc. This control may be based on the outputs of the sensors 226, the navigation system 227, the GPS receiver 228 and the above-stated data and information stored in the memory 218.

The vehicle control module 209 may determine various parameters including a vehicle speed, an engine speed, an engine torque, a gear state, an accelerometer position, a brake pedal position, an amount of regenerative (charge) power, an amount of boost (discharge) power, an amount of auto start/stop discharge power, and/or other information, such as priority levels of source terminals of the power source 204, power, current and voltage demands for each source terminal, etc. The vehicle control module 209 may share this information and the vehicle operating mode with the low-voltage control circuit 207. The low-voltage control circuit 207 may determine other parameters, such as: an amount of charge power at each source terminal; an amount of discharge power at each source terminal; maximum and minimum voltages at source terminals; maximum and minimum voltages at power rails, cells, blocks, packs, and/or groups; SOX values cells, blocks, packs, and/or groups; temperatures of cells, blocks, packs, and/or groups; current values of cells, blocks, packs, and/or groups; power values cells, blocks, packs, and/or groups; etc. The low-voltage control circuit 207 may determine connected configurations of the cells and corresponding switch states based on the parameters determined by the vehicle control module 209 and/or the low-voltage control circuit 207. In one embodiment, the vehicle control module 209 and the low-voltage control circuit 207 are implemented as a single control module.

FIG. 3 shows a battery tray 300 including metal coated fibers. The battery tray 102 of FIG. 1 may be implemented as the battery tray 300 and/or other battery tray referred to herein. Examples of the metal coated fibers are shown in FIGS. 4-7. The battery tray 300 includes walls 302 (e.g., top, bottom and sidewalls), which may be formed of a stitched fabric including the metal coated fibers. The battery tray 300 may include a single upper portion (or component) 304 and a single lower portion (or component) 306 that are attached together to provide the battery tray 300. The upper portion may be adhered to and/or attached to the lower portion via fasteners. The fasteners may extend through, for example, laterally outward extending and facing flanges of the portions 304, 306.

Figure 8:
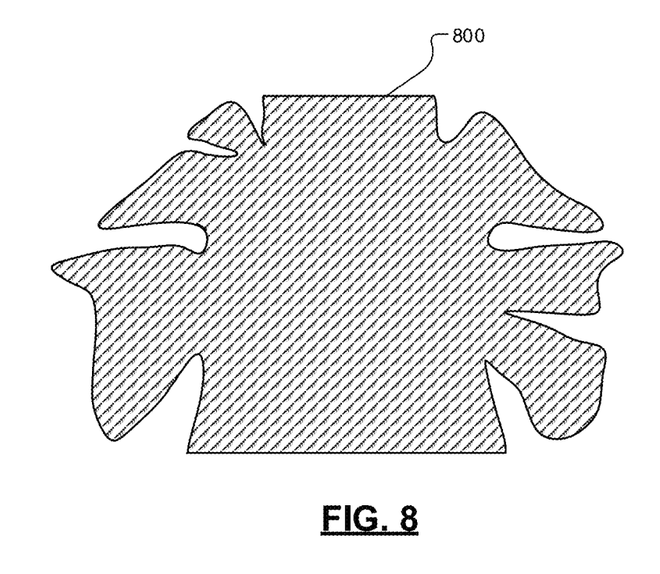
FIG. 8 is a perspective view of a preform including metal coated fiber in accordance with the present disclosure.

As an example, the walls 302 may be formed of a composite fabric material including 25%-59% by volume fiber reinforcements (or reinforcement fiber), 40%-70% by volume a polymeric resin matrix, and 1-5% by volume metal coated fibers implemented as preform stitches. The "by volume" values refer to volume of the composite fabric material. As used herein, a "preform" may refer to a precut stitched fabric that is later formed to provide a portion of a battery tray. An example of a preform is shown in FIG. 8. The preform stitches may be formed using a tailored fiber placement method. This is further described below with respect to FIG. 5.

The reinforcement fibers of the stitched fabric of the battery tray 300 may include glass fibers, carbon fibers, heat-resistant and high-strength synthetic fibers, natural fibers and/or polyester threads. The metal coated fibers are continuous and form an array of grids or apertures that cover surfaces of the preform. The sizes of the grids and apertures are set based on the wavelengths of electromagnetic signals and to reflect the electromagnetic signals. At least some of the metal coated fibers extend through the composite fabric material, which may be cut to provide a preform. The metal coated fibers may be nickel coated and/or copper coated. In one embodiment, the metal coated fibers include coatings formed of both nickel and copper.

The metal coated fibers may have various areal weights (or densities), electric resistivities, thicknesses, shape patterns, and dimensions. Areal weight has a units-of-measure of grams per square meter ($g/m^2$). The higher the areal weight, the lower the surface resistivity. The surface resistivity may refer to a carbon surface resistivity, a nickel coated carbon surfaces resistivity, or a steel, copper and nickel coated carbon surface resistivity. Surface resistivity may have units of measure of Ohms per square ($\Omega/sq$). The surface resistivity of copper and nickel coated carbon is less than the resistivity of nickel coated carbon, which is less than the surface resistivity of carbon.

The areal densities of the metal coated fibers at various locations may be tailored based on EMI requirements. For example, areal densities for different areas of a battery tray may be selected and stitched fabric walls and/or portions thereof of the battery tray may be formed to have the selected areal densities. This can provide more electromagnetic field shielding in certain areas of the battery tray than other areas of the battery tray.

The metal coated fibers provide an electromagnetic shield that reflects electromagnetic incident waves both internally and externally. Arrows 310 refer to electromagnetic incident waves and arrows 312 refer to reflected electromagnetic waves.

Figure 4:
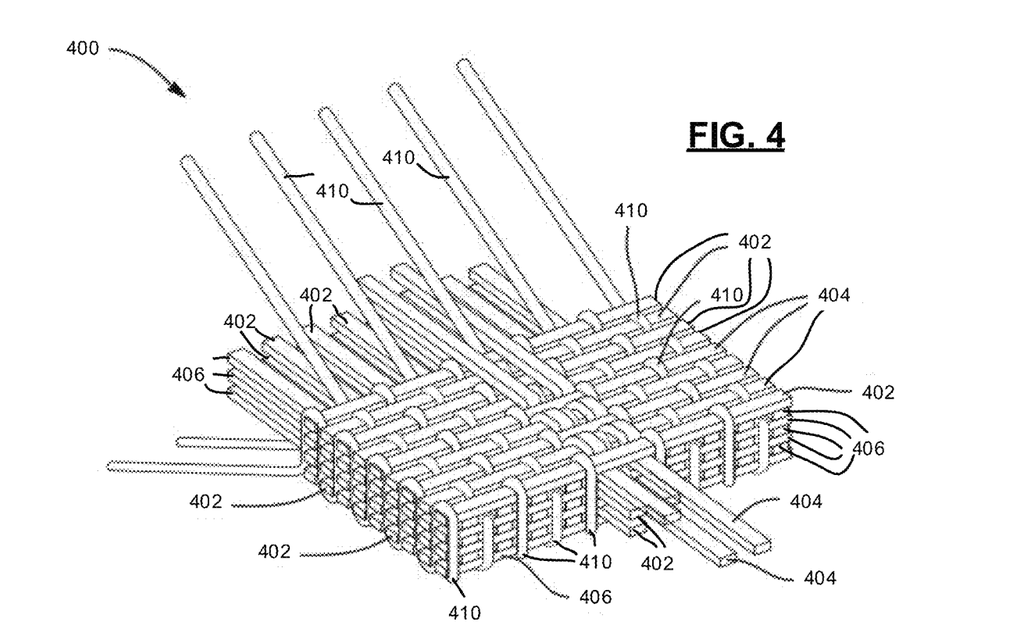
FIG. 4 is a perspective view of a stitched fabric including metal coated fibers in accordance with the present disclosure.

An example of the stitched fabric of the battery tray 300 is shown in FIG. 4. FIG. 4 shows a stitched fabric 400 including metal coated fibers. The stitched fabric includes multiple layers of fibers arranged in layers. Each layer may have one or more types of reinforcement fibers, one or more types of metal coated fibers and/or fibers coated with one or more metallic materials, and a resin matrix. Example materials of the reinforcement fibers and metallic fibers are stated above. The reinforcement and metal coated fibers (referred to as "the fibers") may have different sizes, thicknesses, cross-sectional shapes, same or different numbers of layers, etc. The stitched fabric 400 may include one or more types of metal coated fibers and/or fibers coated with one or more metallic materials, such as copper, nickel, and/or a combination thereof.

As an example, in FIG. 4, first fibers 402 may be reinforcement fibers (e.g., carbon fibers), second fibers (or metal coated fibers) 404 may be copper coated fibers, and third fibers (or metal coated fibers) 406 may be nickel coated fibers. The first fibers 402 extend in 0° and 90° directions. The second fibers 404 may form a woven pattern on a surface of the overall stack. The woven pattern may cover a portion of a whole surface (e.g., a top and/or bottom surface) of the overall stack. The second fibers 404 may extend parallel and/or transverse relative to the first fibers 402 and the third fibers 406. Fourth fibers 410, which may include metal coated fibers may extend laterally across and through the layers via corresponding holes (or apertures) in the layers. In FIG. 4 the fourth fibers 410 are shown as extending vertically through the stitched fabric 400, but may extend in other directions depending on the orientation of the stitched fabric 400. The third fibers 406 and the fourth fibers 410 may form grids on a thickness direction of the overall stack. The grids may be as shown on outer sides of the overall stack. Adjacent ones of the fourth fibers 410 may be wrapped around different stacks of fibers (e.g., fibers 402 and 404) and in opposite vertical directions, as shown.

Figure 5:
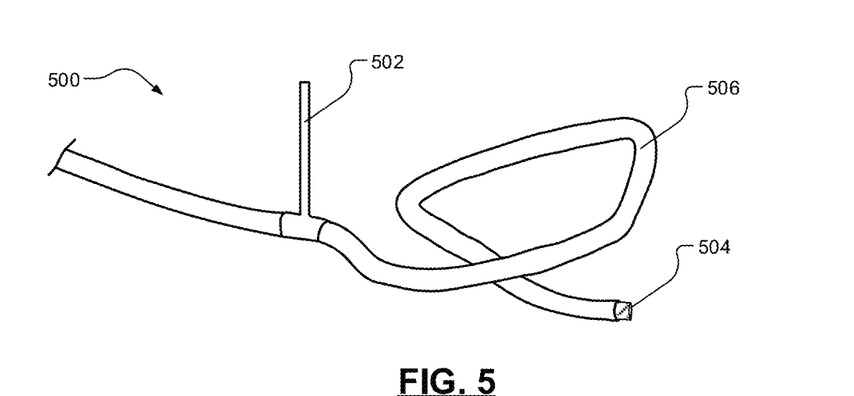
FIG. 5 is a perspective view of a metal coated fiber utilized in a tailored fiber placement process to form a stitched fabric in accordance with the present disclosure.

FIG. 5 shows a metal coated fiber 500, which may be placed in different pattern using a tailored fiber placement process to form a stitched fabric, such as the stitched fabric 400 of FIG. 4. A roving pipe 502 and/or a stitching head may be used to hold, place and stitch a fiber (e.g., a reinforcement fiber or a metal coated fiber). The metal coated fiber 500 extends through an end of the roving pipe 502. The metal coated fiber 500 includes a core 504 and an outer metal coating 506. The core 504 may include a non-metallic fibrous material. The metal coating 506 may include copper and/or nickel.

The tailored fiber placement method may be used to produce preforms shaped and sized to include low areal density metal coated fibers. An example preform is shown in FIG. 8. This provides electromagnetic shields with high EMSE for battery tray implementations. The stitched fabric disclosed herein that is produced using the tailored fiber placement process includes metal coated fiber stitches as non-reinforcement components. The metal coated fiber stitches may be disposed in different patterns, such as chain, tricot, hybrid and/or triangle patterns. The materials of the reinforcement fibers may include glass fibers, carbon fibers, natural fibers, polyester fibers, nylon fibers, and/or a combination thereof.

Figure 6:
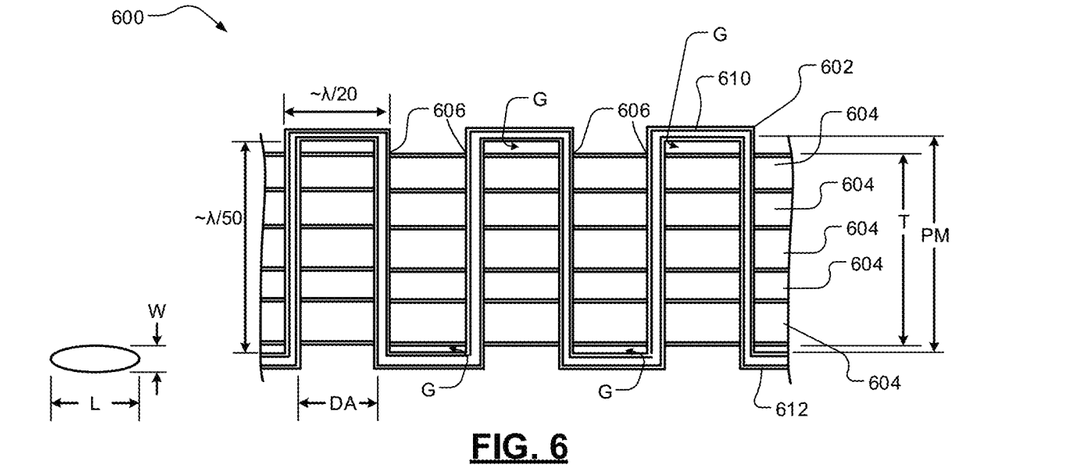
FIG. 6 is a side cross-sectional view of a portion of the a stitched fabric including a through-stitched metal coated fiber in accordance with the present disclosure.

FIG. 6 shows a portion 600 of a stitched fabric including a through-stitched metal coated fiber 602. A stack up of stitched fiber layers 604 are shown with the metal coated fibers 602 extending laterally and though apertures 606 in the stitched fiber layers 604 Although the metal coated fiber 602 is shown in a cross-sectional "square-wave" like pattern, the metal coated fiber may be in other patterns. Also, although gaps G are shown between the metal coated fiber 602 and the outermost ones of the layers 604, no gaps may exist between the metal coated fiber 602 and the outermost ones of the layers 604. Each of the layers 604 may include reinforcement fibers, metal coated fibers and/or resin. Resin layers may be disposed between each of the fiber layers 604. The fibers of each of the layers 604 may be arranged in grid-like patterns and/or in other patterns. Although a certain number of layers 604 are shown, any number of layers may be included.

Figure 9:
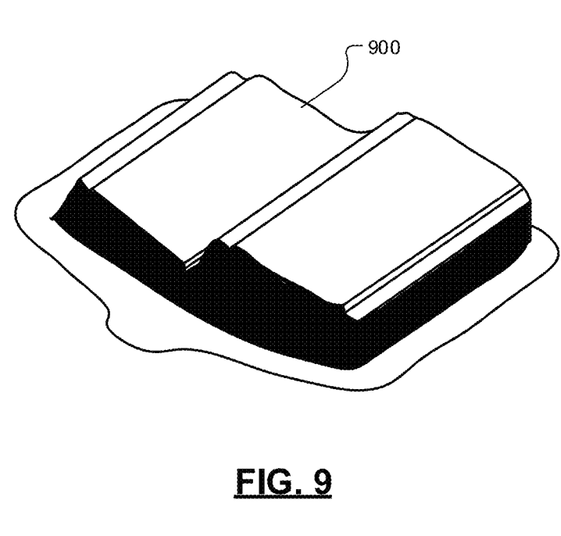
FIG. 9 is a perspective view of a portion of a battery tray formed with the preform of FIG. 8.

The stack up of stitched fiber layers 604 may be part of a fiber fabric and a preform as shown in FIG. 8. The fiber fabric includes metal coated fibers that can be draped into 3D shapes and molded to form battery tray components. As referred to herein, battery tray components may include an upper (or top) half and a lower (or bottom) half, which are brought together to form a battery tray. Although the battery trays are primarily referred to herein as being in two parts, the battery trays may include more than two parts. Also, the parts (or components) of the battery trays may not be equally sized parts. As an example, one part is shown in FIG. 9. The top half may be referred to as a cover. The battery tray components may be formed using various methods including, a HP-RTM process (an example of which is shown in and described with respect to FIGS. 10-11), a compression molding process (an example of which is shown in and described with respect to FIGS. 12-13), and/or other suitable process.

The apertures extend through the layers 604 and are equal in length to the thickness T of the collective layers 604. An example distance DA between apertures and an example distance PM between parallel members (e.g., parallel members 610, 612) are shown. The parallel members refer to members extending parallel to the layers 604 and on opposite sides of the collective layers 604. The distance PM may be greater than or equal to the thickness T. In one embodiment, the distance PM is equal to $\lambda/50$ and the distance DA is equal to $\lambda/20$, although in FIG. 6 the distance PM is shown as being longer than the distance DA.

In one embodiment, cross-sections of the apertures may be circular shaped, elliptical shaped, rectangular shaped or have another geometrical shape. In one embodiment, the major dimensions (e.g., length and width) of the apertures are greater than $\lambda/50$, but not larger than $\lambda/20$. The cross-sectional dimensions are measured perpendicular to at least one of (i) respective longitudinal lengths of the apertures, or (ii) respective paths of the apertures. In one embodiment, the metal coated fibers extend through and fill the openings of the apertures and have similar outer dimensions as inner dimensions of the apertures. Example length and width dimensions L and W are shown in FIG. 6 for an elliptical-shaped slot. The shielding effectiveness of single aperture with a slot opening length (L=longest dimension) may be represented by equation 1, where L is length of slot of the aperture and A is a wavelength of an electromagnetic signal (or electromagnetic field) to which, for example, the battery tray is exposed. The length L and the wavelength A may be measured in meters.

$$SE_{dB} = 20\log_{10}\left(\frac{\lambda}{2}\right)L \tag{1}$$

For an array of apertures, equation 2 may be satisfied, where K=20 for a slot, K=40 for a round hole, and n is the number of apertures within $$\frac{\lambda}{2}.$$

$$SE_{dB} = K\log_{10}\left(\frac{\lambda}{2}\right)L - 20\log_{10}n \tag{2}$$

The higher the shielding effectiveness value, the better the shielding performance. The following equation 3 is solved in terms of the length L to determine the aperture size for a given attenuation, where K=20 for a slot, K=40 for a round hole, and n is the number of apertures within $$\frac{\lambda}{2}.$$

$$L = \frac{10^{\lambda(SEdB/K)}}{2} \tag{3}$$

Figure 7:
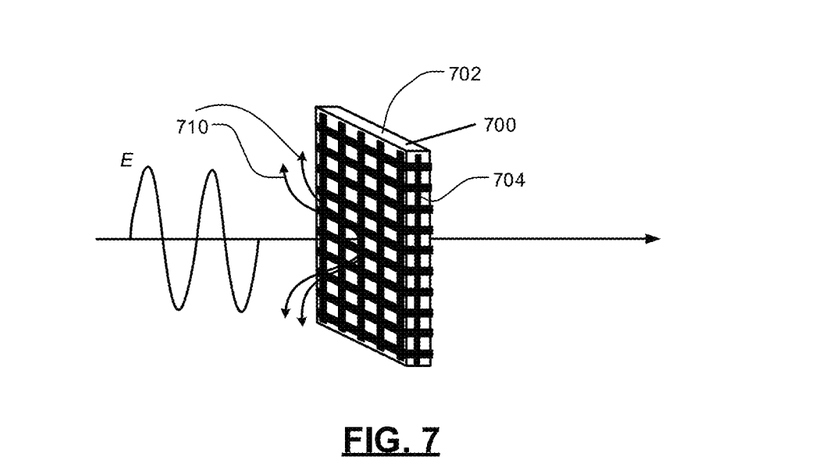
FIG. 7 is a diagram illustrating electromagnetic wave reflection off a fabric stitched with metal coated fiber in accordance with the present disclosure.

FIG. 7 shows a diagram illustrating electromagnetic wave reflection off a fabric 700 stitched with metal coated fiber. The fabric 700 may be a preform as disclosed herein. The preform may include conductive fiber stitches in orthogonal grids (e.g., 702, 704) and extending through apertures, which are sized to satisfy EMSE requirements. The apertures may be arranged in grid-like patterns. An electromagnetic wave E is shown and is reflected off of the fabric as represented by arrows 710. The metal coating on the metal coated fibers disclosed herein are connected to a ground reference 130, as shown in FIG. 1.

FIG. 8 shows a preform 800 including metal coated fiber as described herein. The preform 800 and other preforms referred to herein may be formed using the methods described herein. The preforms may be cut in various patterns. An example pattern is shown in FIG. 8. The pattern is shaped to allow the preform to drape over a mold and form a predetermined 3D component. As an example, the preform in FIG. 8 may be draped over a mold to form a battery tray part 900 as shown in FIG. 9.

Figure 10:
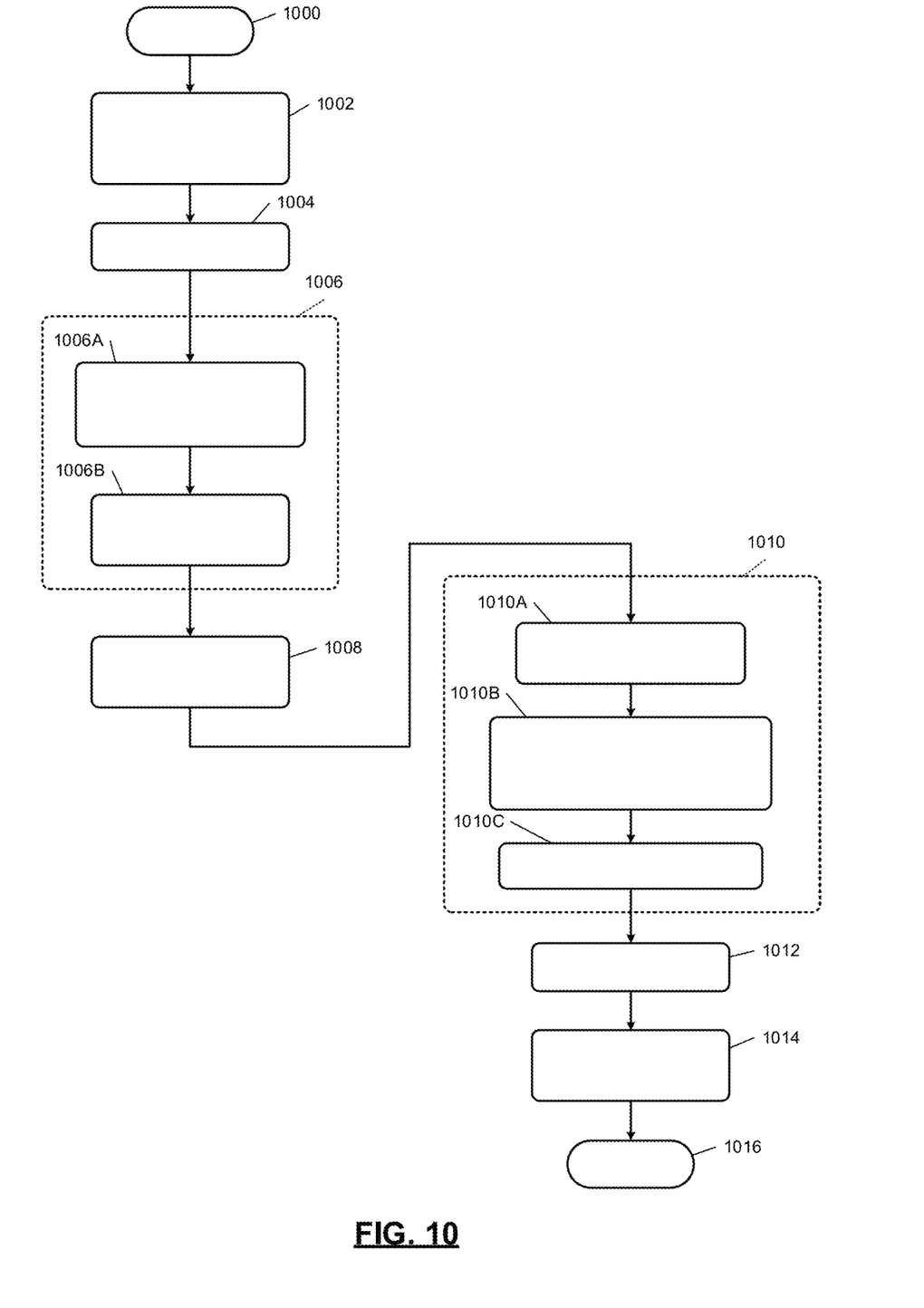
FIG. 10 illustrates a high-pressure resin transfer molding (HP-RTM) process in accordance with the present disclosure.
Figure 11:
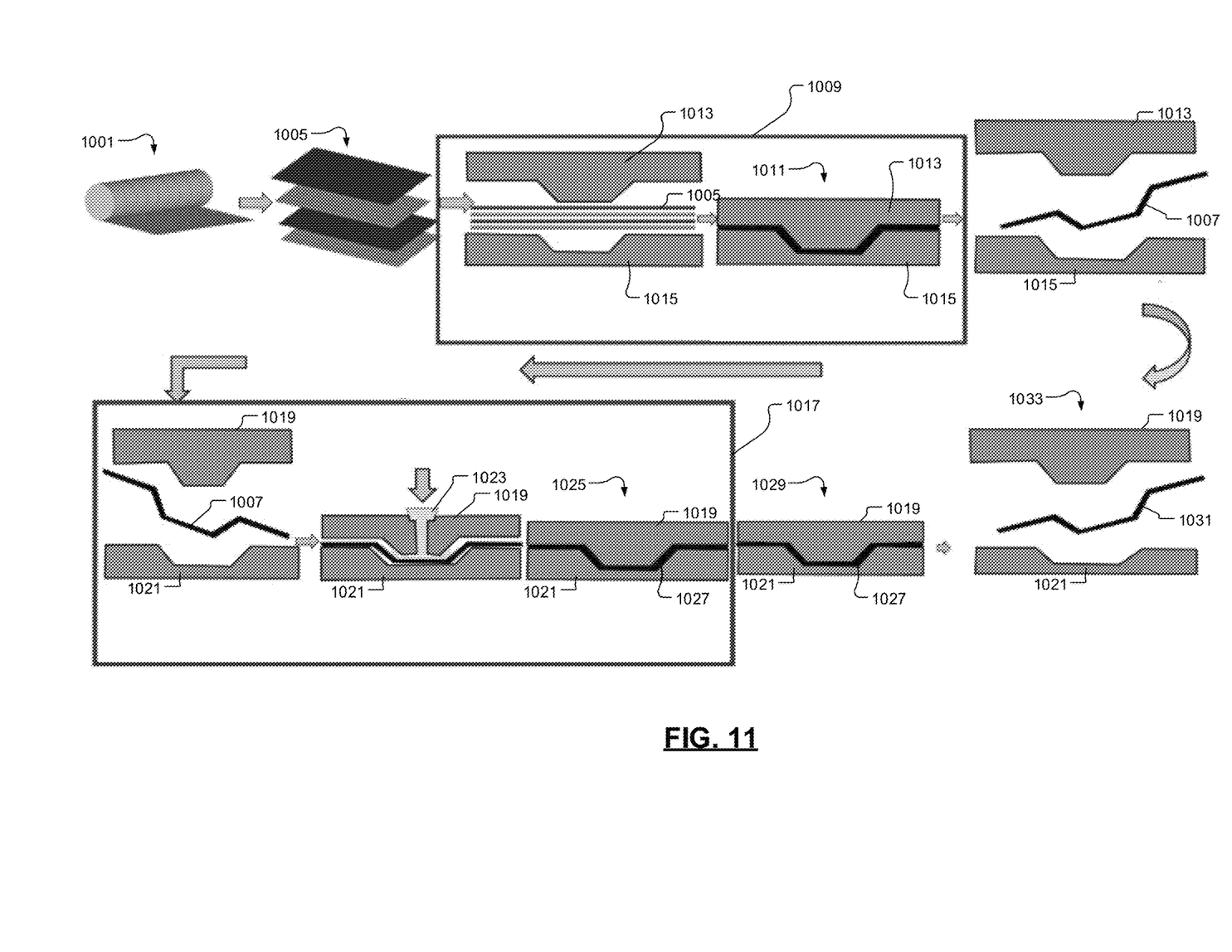
FIG. 11 is a process diagram illustrating operations performed during the HP-RTM process of FIG. 10.

The stitched fabrics and preforms including metal coated fibers disclosed herein may be formed using the methods of FIGS. 10-13. FIG. 10 shows a high-pressure resin transfer molding (HP-RTM) process. FIG. 11 shows a process diagram illustrating operations performed during the HP-RTM process of FIG. 10.

The HP-RTM process may begin at 1000. At 1002, a stitched stabilized fabric 1001 is formed and/or provided and includes metal coated fibers with a binder (e.g., resin). At 1004, a stack-up of wove sheets (or fabric sheets) 1005 is formed. The stitched fabric 1001, which may be in a roll, as shown, may be cut into sheets and stacked. Each sheet may have a similar fiber arrangement as that shown in FIG. 4 or a different fiber arrangement.

At 1006, a preform 1007 is formed during a preforming process, designated by box 1009. At 1006A, the stack-up of sheets 1005 is placed in a press 1011 having a preforming (or first) mold including an upper portion 1013 and a lower portion 1015. The stack-up of sheets 1005 are draped over the lower portion 1015. At 1006B, the stack-up of sheets 1005 are pressed together and heated. At 1008, the preform 1007 is removed from the press, cooled (or brought to room temperature) and as a result stabilized.

At 1010, resin filling is performed, which is designated by box 1017. At 1010A, the preform 1007 is placed in a second press having a HP-RPM mold including an upper portion 1019 and a lower portion 1021. At 10108, the upper portion 1019 is moved relative to the lower portion 1021 to be in a partially open state for infusion of resin via an injection channel 1023. At 1010C, the resin infused preform in pressed using tonnage, designated by arrow 1025.

At 1012, the resin infused preform 1027 is cured, which is designated by arrow 1029. This may include baking the preform 1027 at a certain temperature for a predetermined period of time and/or allowing the resin to cool and cure. At 1014, the resulting component (or part) 1031, such as a battery tray component, is removed from the HP-RPM mold, designated by arrow 1033. The method may end at 1016.

Figure 12:
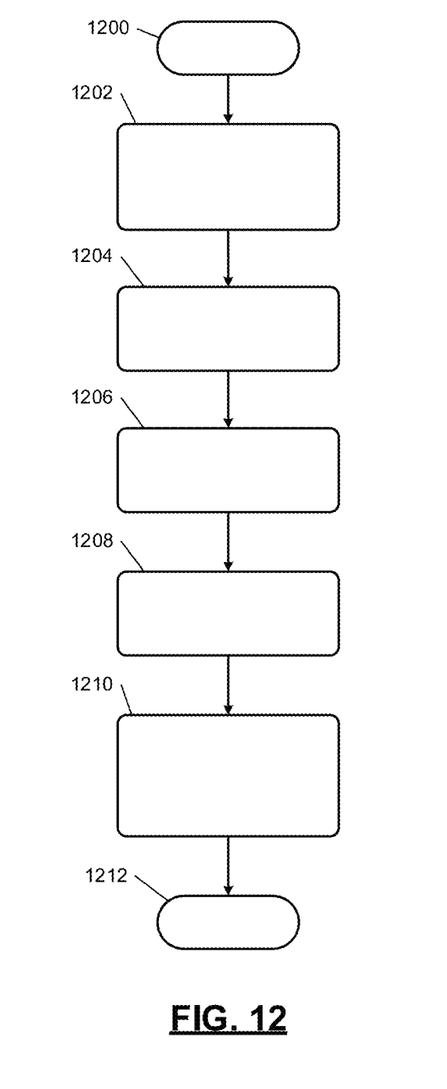
FIG. 12 illustrates a compression molding process in accordance with the present disclosure.
Figure 13:
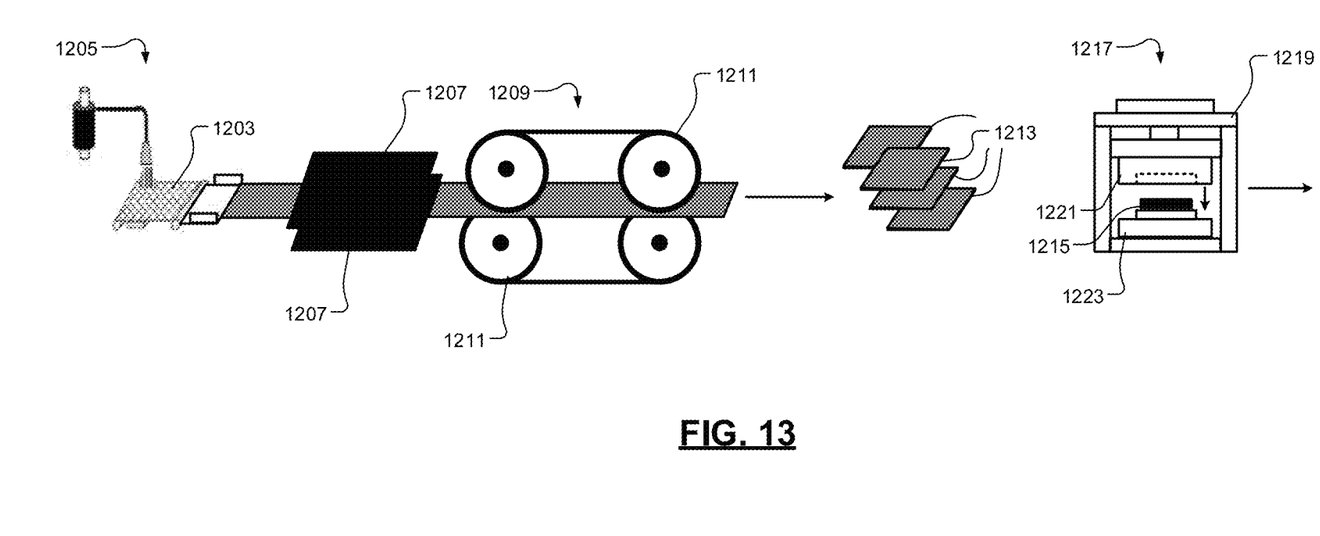
FIG. 13 is a process diagram illustrating operations performed during the compression molding process of FIG. 12.

FIG. 12 shows a compression molding process. FIG. 13 shows a process diagram illustrating operations performed during the compression molding process of FIG. 12 by a thermoset or thermoplastic prepreg system. The method may begin at 1200. At 1202, prepreg material 1203 is formed including metal coated fiber, designated by arrow 1205. The prepreg material 1203 may include stitched fabric as shown in FIG. 4 or similar fabric.

At 1204, the prepreg material 1203 is heated in an oven, designated by heating planes 1207. At 1206, the heated prepreg material is pressed. In an embodiment, the prepreg material is double belt pressed (i.e. pressed between two belts), designated by arrow 1209 and rolling belts 1211.

At 1208, the heated and pressed prepreg material may then be cut to provide plies of material 1213, which are stacked. At 1210, the stacked plies of material 1215 are hot pressed to form a battery tray component, designated by arrow 1217. The stacked plies of material 1215 are pressed in a hot press 1219 having a mold including an upper portion 1221 and a lower portion 1223. The method may end at 1212.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery tray comprising:
   a first component comprising a first set of walls, wherein the first set of walls comprises a first stitched fabric, and wherein the first stitched fabric comprises a first plurality of stacked stitched fabric layers and first metal coated fibers; and
   a second component comprising a second set of walls, wherein the second set of walls comprises a second stitched fabric, wherein the second stitched fabric comprises a second plurality of stacked stitched fabric layers and second metal coated fibers, wherein the second component is attached to the first component to form the battery tray, which is configured to hold a battery pack of a vehicle, and
   wherein
   the first metal coated fibers and the second metal coated fibers provide an electromagnetic shield surrounding the battery pack,
   each of some of the first metal coated fibers extends parallel and perpendicular to the first plurality of stacked stitched fabric layers and through multiple first apertures in each of the first plurality of stacked stitched fabric layers, and
   sets of the first apertures extend parallel to a stacked direction of the first plurality of stacked stitched fabric layers, where each set of the first apertures includes aligned apertures respectively of the first plurality of stacked stitched fabric layers.

2. The battery tray of claim 1, wherein:
the first stitched fabric comprises the first plurality of stacked stitched fabric layers; and
the second stitched fabric comprises the second plurality of stacked stitched fabric layers.

3. The battery tray of claim 2, wherein:
each of the first plurality of stacked stitched fabric layers is a separate distinct fabric layer, comprises a respective set of woven fibers, and do not include the some of the first metal coated fibers; and
each of the second plurality of stacked stitched fabric layers is a separate distinct fabric layer comprises a respective set of woven fibers, and does not include some of the second metal coated fibers.

4. The battery tray of claim 1, wherein:
the first stitched fabric is implemented as a first preform; and
the second stitched fabric is implemented as a second preform.

5. The battery tray of claim 1, wherein;
the second stitched fabric includes second apertures with some of the second metal coated fibers extending through the second apertures;
each of the first apertures and the second apertures has a cross-sectional dimension greater than $\lambda/50$ and less than $\lambda/20$ such that the first stitched fabric and the second stitched fabric reflect electromagnetic waves experienced by the battery tray; and
the cross-sectional dimensions are measured perpendicular to at least one of (i) respective longitudinal lengths of the first apertures and the second apertures, or (ii) respective paths of the first apertures and the second apertures.

6. The battery tray of claim 1, wherein each of the first metal coated fibers and the second metal coated fibers comprises an inner non-metallic fibrous core and a metallic coating disposed over the inner non-metallic fibrous core.

7. The battery tray of claim 1, wherein the first metal coated fibers and the second metal coated fibers are connected to a reference ground.

8. The battery tray of claim 1, wherein the first stitched fabric and the second stitched fabric collectively comprise:
   25%-59% reinforcement fibers by volume;
   40%-70% polymeric resin matrix by volume; and
   1-5% metal coated fibers by volume including the first metal coated fibers and the second metal coated fibers.

9. The battery tray of claim 1, wherein reinforcement fibers of the first stitched fabric and the second stitched fabric comprise at least one of glass fibers, carbon fibers, polyester fibers, or natural fibers.

10. The battery tray of claim 1, wherein at least one of
    the first metal coated fibers form at least one of an array of grids or an array of apertures; or
    the second metal coated fibers form at least one of an array of grids or an array of apertures.

11. The battery tray of claim 1, wherein metallic coatings of the first metal coated fibers and the second metal coated fibers comprise at least one of nickel or copper.

12. The battery tray of claim 1, wherein at least one of an areal density of the first metal coated fibers varies across the first stitched fabric or an areal density of the second metal coated fibers varies across the second stitched fabric.

13. A power system comprising:
    the battery tray of claim 1;
    the battery pack contained within the battery tray; and
    a control circuit connected to at least one of the battery tray or the battery pack and monitoring and controlling states of the battery pack.

14. The battery tray of claim 1, wherein;
    each of the first metal coated fibers is arranged in a square-wave pattern such that each of the first metal coated fibers traverses through the first plurality of stacked stitched fabric layers multiple times; and
    the square-wave pattern is visible by taking a cross-section through the first component in a stacked direction of the first plurality of stacked stitched fabric layers.

15. The battery tray of claim 14, wherein the lengths and widths of each of the first apertures are greater than $\lambda/50$ and less than or equal to $\lambda/20$.

16. The battery tray of claim 1, wherein:
    the first stitched fabric comprises a plurality of resin layers each of which being disposed between a respective adjacent pair of the first plurality of stacked stitched fabric layers; and
    the some of the first metal coated fibers extend through the plurality of resin layers.

17. The battery tray of claim 1, wherein:
    each of the first plurality of stacked stitched fabric layers comprises some of the first metal coated fibers; and
    each of the second plurality of stacked stitched fabric layers include some of the second metal coated fibers.

18. The battery tray of claim 1, wherein:
    each of the first metal coated fibers is arranged in a square-wave pattern;
    each of the first metal coated fibers is arranged in the square-wave pattern and extends through the first apertures; and
    at least one of i) distances between adjacent ones of the first apertures are each equal to $\lambda/20$, and ii) distances between parallel members of the first metal coated fibers are each equal to $\lambda/50$, such that the first stitched fabric reflects electromagnetic waves experienced by the battery tray.

19. The battery tray of claim 18, wherein:
    each of the second metal coated fibers is arranged in a square-wave pattern and extends through multiple second apertures in each of the second plurality of stacked stitched fabric layers; and
    at least one of
    distances between adjacent ones of the second apertures are each equal to $\lambda/20$; and
    distances between parallel members of the second metal coated fibers are each equal to $\lambda/50$.

20. The battery tray of claim 18, wherein at least one of i) the distances between the parallel members of the first metal coated fibers are greater than a thickness of the first plurality of stacked stitched fabric layers, and ii) the distances between the parallel members are greater than the distances between the first apertures.

* * * * *